United States Patent [19]

Fixell et al.

[11] Patent Number: 4,765,566

[45] Date of Patent: Aug. 23, 1988

[54] METHOD AND APPARATUS FOR REDUCING PROJECTILE SPREAD

[75] Inventors: Jan-Olov Fixell; Thomas Gustafsson; Gösta Högberg; Stig Engfors; Kjell Albrektsson; Arne Franzén, all of Karlskoga, Sweden

[73] Assignee: Aktiebolaget Bofors, Bofors, Sweden

[21] Appl. No.: 21,827

[22] Filed: Mar. 4, 1987

[51] Int. Cl.⁴ .................. B21K 21/06; F42B 13/00
[52] U.S. Cl. .................. 244/3.23; 102/473; 102/501; 29/1.2
[58] Field of Search .......... 244/3.1, 3.23, 3.3; 102/473, 501; 273/421, 423; 29/1.2

[56] References Cited

U.S. PATENT DOCUMENTS

| | | | |
|---|---|---|---|
| 3,949,677 | 4/1976 | Voss | 244/3.1 |
| 4,116,404 | 9/1978 | Howell | 244/3.1 |
| 4,212,244 | 7/1980 | Flatau | 102/520 |
| 4,241,660 | 12/1980 | Donovan | 102/473 |
| 4,297,948 | 11/1981 | Donovan | 102/473 |
| 4,558,646 | 12/1985 | Hoffmann et al. | 102/527 |
| 4,621,817 | 11/1986 | Musacchia | 273/421 |

FOREIGN PATENT DOCUMENTS

| | | | |
|---|---|---|---|
| 2632288 | 1/1978 | Fed. Rep. of Germany | 273/423 |
| 2049448 | 12/1980 | United Kingdom | 273/423 |

Primary Examiner—Charles T. Jordan
Assistant Examiner—Michael J. Carone

[57] ABSTRACT

A method and an apparatus for reducing the spread of hit pattern for a rotationally-stabilized ammunition unit such as a projectile, which is discharged in a ballistic trajectory from an artillery piece towards a target which is to be combated including dynamic balancing of the shell (1) to reduce the effect of the air resistance between different shells, and increase hit probability. The inclination between the main axis of inertia of the shell and the geometric axis of the shell case are measured, whereafter these axes are set in parallel in that an adjustment weight (2) is mounted on one side of the point of gravity of the shell seen in its longitudinal direction. The adjustment weight (2) preferably consists of a disk or washer provided with an eccentric recess (4) for suitable weight and mass eccentricity.

8 Claims, 2 Drawing Sheets

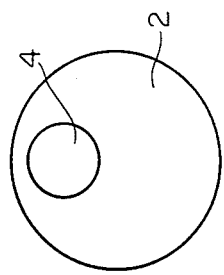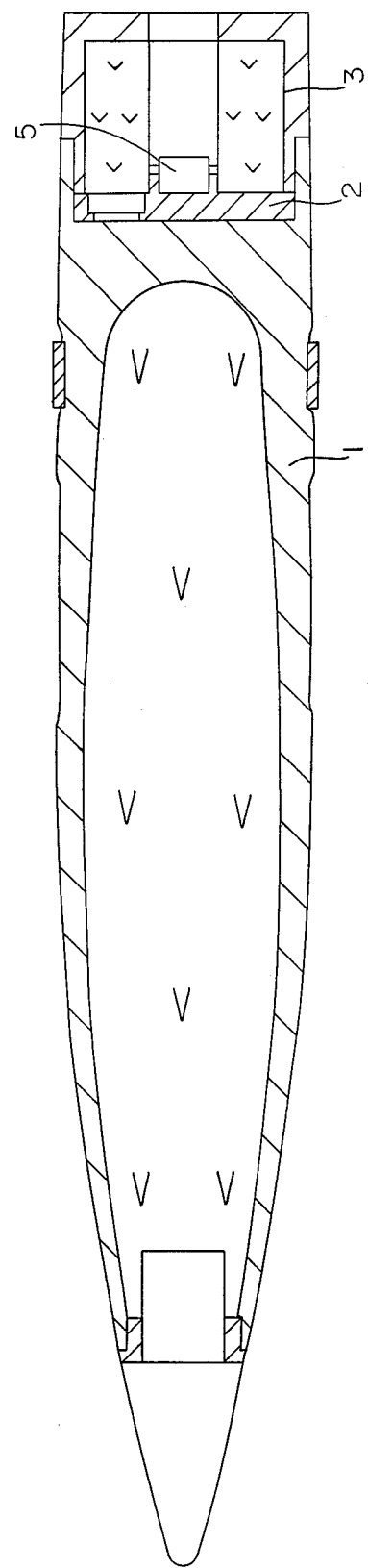
FIG.4
FIG.3

4,765,566

METHOD AND APPARATUS FOR REDUCING PROJECTILE SPREAD

BACKGROUND OF THE INVENTION

The present invention relates to a method and an apparatus for reducing the spread of a hit pattern for a rotationally-stabilized ammunition unit in the form of a projectile, shell or the like, discharged in a ballistic trajectory from a launching device towards a target to be combated. The present invention entails dynamic balancing of the shell in order to reduce differences in air resistance between different shells so as to improve hit probability.

It is previously known in the gunnery art to subject shells to QA inspection and to rectify any thereby ascertained imbalances by the addition of weights or by machining off excess material such that a main axis of inertia coincides with the geometric axis of the shell surface, to eliminate, by such means, deficiencies in the product. Oblique deviations between the geometric axis and the trajectory of the projectile will thereby be avoided, as a result of which variations in air resistance between different shells will be reduced thereby also reducing the spread of shots in a hit pattern.

One drawback inherent in the prior art method is in the difficulty entailed in mechanical rectification of the shell proper as required by the balancing operation without occasioning any further reduction in the overall quality of the finished shell. For example, no modification can be made to the shell casing without resulting in changes to its air resistance. Within the shell, account must be taken of extant devices, for example such that an explosvie charge must, for reasons of safety, be enclosed in an unbroken and smooth-walled cavity. Moreover, adjustment must be affected at two positions on the shell on either side of its point of gravity, seen in the longitudinal direction—or line of trajectory—of the shell.

OBJECT OF THE PRESENT INVENTION

The object of the present invention is to realize a method and an apparatus for balancing rotationally-stabilized ammunition units and thereby reducing the spread of shots in a hit pattern without the necessity of interfering in any way with sensitive parts which are vital to the function of such ammunition units. The inventive concept as herein disclosed is based on measurement of the imbalance of the shell in a balancing apparatus and rectification of the ammunition unit at a combined site of inspection and rectification. The axis of rotation of the unit and its geometric axis may then be set in parallel, in which event the unit, on discharge, will follow a slightly helical trajectory. The angle of pitch of the helix is of the order of magnitude of between 0 and 1 degree in the center of gravity of the projectile and, in practice, the same result will be attained using the method and apparatus accorDing to the present invention as has previously been attained using the prior art method. The balancing apparatus proper may be of a type known in the art and will not, therefore, be described in greater detail.

Adjustment of the projectile may be affected using an adjustment weight which also has othEr functions, for example weight adjustment of the projectile in order to further improve the hit pattern, driving band or aerodynamic head.

BRIEF DESCRIPTION OF THE ACCOMPANYING DRAWINGS

The nature of the present invention and its aspects will be more readily understood from the following brief description of the accompanying drawings, and discussion of one preferred embodiment of the present invention relating thereto.

In the accompanying drawings:

FIGS. 3 and 4 are illustrations corresponding to those in FIGS. 1 and 2, but in these Figures the shell has been provided with a tracer cartridge.

DESCRIPTION OF PREFERRED EMBODIMENTS

Figure 2:
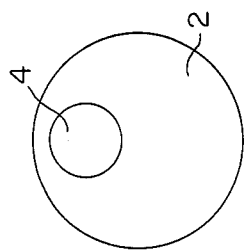
FIG. 2 is another view of the disk of FIG. 1.
Figure 1:
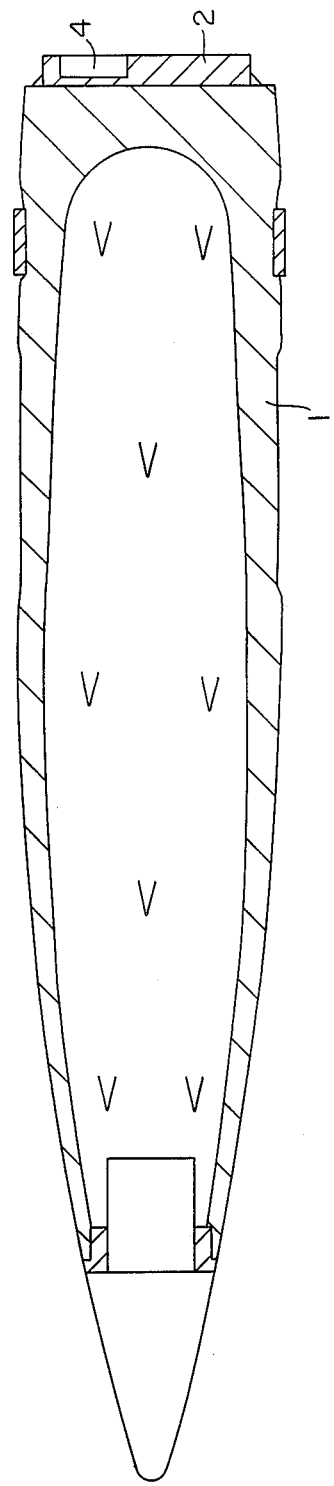
FIG. 1 illustrates a shell with a welded rectification weight in the form of a recessed disk.

When the shell is balanced, it is rotated recumbent on its cylindrical outer surface in the roller stays of a balancing machine. The balancing machine may be of a type know in the art and will not, therefore, be described in detail here. The imbalance, if any, is measured, and the shell is then weighed. A suitable weight and mass eccentricity for the shell 1 are calculated. A suitable adjustment washer 2 is selected from a set of calibrated washers of different weights and mass eccentricities and is mounted at the right angle about the longitudinal axis of the shell in a prepared place. A suitable place is retracted from the periphery of the rear plane of the shell, as shown in FIG. 1, where no disturbance to the ballistic flight and aerodynamic properties of the shell can be affected. Other suitable positions are within a tracer cartridge, as shown in FIG. 3, or in a tail fin if such is disposed on the shell.

The different mass eccentricities of the adjustment washers are realized by means of recesses 4 which may either be open or be filled with a suitable light material. The adjustment washers can be welded in place on the rear plane of the shell. In FIG. 3, the adjustment washer performs the dual function of adjustment and maintaining the igniter 5 of the tracer cartridge. The adjustment washer may also serve as a drive band.

What we claim and desire to secure by letters patent is:

1. A method of reducing the spread of shots in a hit pattern for a rotationally-stabilized ammunition unit in the form of a projectile discharged in a ballistic trajectory from a launching device towards a target which is to be combated, by dynamic balancing of a shell in order to reduce the differences in air resistance between different projectile shells and increase hit probability, comprising the steps of:

measuring the inclination between the main axis of the inertia of said shell and the geometric axis of the shell case setting said two axes in parallel by providing a weight adjustment on one side of the point of gravity of said shell seen in its longitudinal direction, in the rear region of said shell at the rear plane substantially perpendicular to the longitudinal axis of said shell.

2. A method of reducing the spread of shots in a hit pattern for a rotationally-stabilized ammunition unit in the form of a projectile discharged in a ballistic trajectory from a launching device towards a target which is to be combated, by dynamic balancing of a shell in order to reduce the differences in air resistance between different shells to increase hit probability, comprising the steps of:

measuring the inclination between main axis of inertia of said shell and geometric axis of the shell case, setting said two axes in parallel by providing a weight adjustment on one side of the point of gravity of said shell seen in its longitudinal direction, in the rear region of said shell at the rear plane substantially perpendicular to the longitudinal axis of said shell, wherein said adjustment weight is mounted in a tracer cartridge of said shell and may constitute retaining means for an igniter of the tracer cartridge.

3. The method as claimed in claim 2 wherein said adjustment weight for adjustment of the imbalance of said shell is also employed for adjusting the weight of said shell.

4. The method as claimed in claim 3 further comprising the steps of:

calculating suitable weight and mass eccentricity for said shell, and selecting therefrom a suitable adjustment weight from a set of calibrated weights of different mass and mass eccentricity.

5. An apparatus for reducing the spread of a hit pattern for a rotationally-stabilized ammunition unit in the form of a projectile shell discharged in a ballistic trajectory from a launching device towards a target which is to be combated, by dynamic balancing of a shell in order to reduce the difference in air resistance between different shells to increase hit probability, comprising; an adjustment weight located on one side of the point of gravity of said shell, seen in its longitudinal direction, in the rear plane of said shell substantially perpendicular to the longitudinal axis of said shell for parallel setting of the main axis of inerta of said shell and the geometric axis of the shell casing.

6. The apparatus as claimed in claim 5 wherein said adjustment weight includes a washer mounted on the rear plane of said shell.

7. The apparatus as claimed in claim 5 wherein said adjustment weight includes a washer disposed in a tracer cartridge of said shell so that it may simultaneously constitute a retainer means for an igniter of the tracer cartridge.

8. The apparatus as claimed in claim 6 or 7 wherein said adjustment washer is provided with an eccentric recess which determines the mass and mass eccentricity of said washer.

* * * * *